3,122,571
TETRASULFONYL DERIVATIVES OF QUINODI-
METHANES AND CHARGE TRANSFER COM-
PLEXES THEREOF WITH LEWIS BASES
Donald S. Acker, Waynesboro, Va., and Walter R. Hertler, Wilmington, Del., assignors to E. I. du Pont de Nemours and Company, Wilmington, Del., a corporation of Delaware
No Drawing. Filed June 25, 1962, Ser. No. 205,089
14 Claims. (Cl. 260—396)

This invention relates to a new class of highly functionally substituted organic compounds, and more specifically to the 7,7,8,8-tetrakis(hydrocarbylsulfonyl)-q-quinodimethanes, to methods for the preparation thereof, and to the derivatives thereof.

This application is a continuation-in-part of our copending application Serial No. 53,603, filed September 2, 1960, now abandoned.

7,7,8,8-tetrakis(negatively substituted)-p-quinodimethanes comprise an almost unknown class of compounds. Thus, the weakly negatively substituted tetraphenyl compound has been reported by several authors ranging from Thiele et al., Ber. 37, 1473 (1904), through Bergmann, J. Am. Chem. Soc. 75, 2761 (1953). Thiele et al. also imply the structure 7,7,8,8-tetrabromo-p-quinodimethane in an unsuccessful attempt to prepare the compound by the action of mercury on p-bis(tribromomethyl)benzene.

Recently (see the copending application of Acker and Blomstrom, U.S. application Serial No. 17,753, filed March 28, 1960, a new class of 7,7,8,8-tetrakis(strongly negatively substituted)-p-quinodimethanes has now been discovered. In these new products, the functional substituents in the 7,7- and 8,8-positions are defined as carboxyl groups or groups hydrolyzable thereto, including carboxyester, carbamoyl and substituted carbamoyl, cyano, and the like. The most interesting of these new products is 7,7,8,8-tetracyano-p-quinodimethane which exhibits extremely unusual physical and chemical properties. Thus, in reaction with ammonia and amino hydrogen-bearing amines, it first forms the charge-transfer compound and subsequently eliminates a mole of HCN, leaving the residues of the amine in the position of the replaced cyano group. If the stoichiometry is so arranged, two such elimination reactions can be achieved. In an analogous fashion, this compound reacts with the alkali metal and alkaline earth metal hydrocarbyl oxides to similarly replace one or two of the cyano substituents, depending on the stoichiometry, with a hydrocarbyloxy radical. In both the amine and the hydrocarbyl oxide reactions, when two cyano substituents are replaced they are on the same carbon.

There has now been discovered a new class of 7,7,8,8-tetrakis functionally substituted materials which are fundamentally quite different from the foregoing types. These new compounds are the 7,7,8,8-tetrakis(hydrocarbylsulfonyl)-p-quinodimethanes. In these new compounds, the said hydrocarbyl substituents are generally of from one to eight carbons each and preferably have no chain branching on the alpha-carbon thereof. That is, the carbon attached to the sulfur has at least two hydrogens bonded to it. Also included in these new compounds are the 7,7,8,8-tetrakis(hydrocarbylsulfonyl) compounds carrying from one to two lower alkyl or halogen substituents on the 2-, 3-, 5-, and 6-positions, i.e., on the ring carbons of the quino ring not involved in linkage to the methylene carbons. These new products can be represented by the following structural formula in which the R's are monovalent hydrocarbyl, including specifically alkyl, aryl, alkaryl, aralkyl, and cycloalkyl, substituents of no more than eight carbons each, and preferably saturated aliphatic monovalent hydrocarbon radicals, i.e., alkyl radicals, of from one to four carbons. The R substituents attached to the sulfonyls on any one methylene carbon can be joined to form a cyclic structure with the two sulfonyl sulfur atoms and intervening carbon of no more than six ring members. That is, the R's are taken together to form a divalent hydrocarbyl radical bridging the two sulfonyl groups, e.g.,

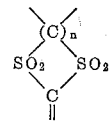

where, preferably, n is 2 or 3. The X's, which can be alike or different, are hydrogen, alkyl radicals of from one to four carbons, and halogens, preferably of atomic number 9–17. In any one compound no more than two of the X's can be halogen or alkyl.

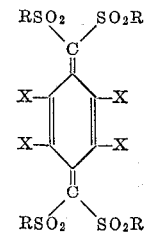

Unlike the aforesaid described 7,7,8,8-tetra-substituted p-quinodimethanes wherein the substituents are carboxyl or groups hydrolyzable thereto, and especially cyano, these new 7,7,8,8-tetrakis(hydrocarbylsulfonyl)-p-quinodimethanes react quite differently chemically. Thus reaction with ammonia and/or hydrogen-bearing amines instead of forming only the charge-transfer compound and subsequently the amine substitution product results in reduction of the quino ring to give the 7,7,8,8-tetrakis(hydrocarbylsulfonyl-substituted)-p-xylene and a different addition substitution elimination product. Thus, when 7,7,8,8-tetrakis(ethylsulfonyl)-p-quinodimethane is reacted with ammonia, there is obtained alpha,alpha,alpha',alpha'-tetrakis(ethylsulfonyl)-p-xylene and α,α-bis(ethylsulfonyl)-p-toluonitrile, i.e., p-bis(ethylsulfonyl)methylbenzonitrile. In contrast, when ammonia is reacted with 7,7,8,8-tetracyano-p-quinodimethane first, there is obtained the charge-transfer anion-radical salt, ammonium tetracyano-p-quinodimethanide from which there is obtained the substitution products, 7-amino-7,8,8-tricyano- and 7,7-diamino-8,8-dicyano-p-quinodimethane.

Similarly, when tertiary amines are reacted with 7,7,8,8-tetracyano-p-quinodimethane, the charge-transfer anion-radical salts are obtained; whereas, similar reaction with the 7,7,8,8-tetrakis(hydrocarbylsulfonyl)-p-quinodimethanes of the present invention results only in the formation of the dihydro product, i.e., the substituted p-xylene. More specifically, when 7,7,8,8-tetracyano-p-quinodimethane is reacted with triethylamine or tetramethyl-p-phenylenediamine, there is obtained the corresponding TCNQ/amine charge-transfer anion-radical salt. Conversely, when 7,7,8,8-tetrakis(ethylsulfonyl)-p-quinodimethane is reacted with the same tertiary amines, there is obtained alpha,alpha,alpha',alpha'-tetrakis(ethylsulfonyl)-p-xylene.

Similarly, reaction of these new 7,7,8,8-tetra-(hydrocarbylsulfonyl-substituted)-p-quinodimethanes with an alkali metal hydrocarbyl oxide results in the conversion of the quino ring to an aromatic structure and the removal of two of the hydrocarbylsulfonyl groups, both on the same external carbon. Aqueous hydrolysis of the resultant orthoester affords a normal ester function. More specifically, when 7,7,8,8-tetrakis(ethylsulfonyl)-p-quinodimethane is reacted with sodium methoxide in methanol, there is obtained alpha,alpha-bis(ethylsulfonyl)-alpha', alpha',alpha'-trimethoxy-p-xylene from which on aqueous said hydrolysis there is obtained methyl alpha,alpha-bis-(ethylsulfonyl)-p-toluate. In contrast, when 7,7,8,8-tetrakis(methoxycarbonyl)-p-quinodimethane or the corresponding tetrakis(ethoxycarbonyl compound) is reacted with sodium methoxide in methanol, there is obtained the corresponding alpha,alpha,alpha',alpha'-tetrakis(methoxycarbonyl)- or -(ethoxycarbonyl)-alpha-methoxy-p-xylene.

The following examples in which the parts given are by weight are submitted to illustrate the present invention further but not to limit it.

EXAMPLE I

*Part A.—Preparation of Alpha,Alpha,Alpha',Alpha'-Tetrakis(Ethylthio)-p-Xylene*

A stream of gaseous hydrogen chloride was passed under anhydrous conditions into a mixture of 13.4 parts of terephthalaldehyde and 30 parts (4.8 molar proportions based on the aldehyde) of ethanethiol until spontaneous refluxing ceased. The resulting mixture was warmed under reduced pressure to remove excess mercaptan. The resulting crystalline mass was collected and washed with water. The product was dissolved in excess pentane and dried over anhydrous magnesium sulfate. After filtering, the solution was evaporated to a volume corresponding to about 100 parts of water, and the solid alpha,alpha,-alpha',alpha'-tetrakis(ethylthio)-p-xylene removed by filtration as white crystals melting at 44.5–45.5° C. There was obtained 25.1 parts (72.4% of theory). A second crystallization from pentane afforded a product melting at 44.5–46° C.

*Analysis.*—Calcd. for $C_{16}H_{26}S_4$: S, 37.0%. Found: S, 37.3%.

*Part B.—Preparation of Alpha,Alpha,Alpha',Alpha'-Tetrakis(Ethylsulfonyl)-p-Xylene*

A mixture of 100 parts of the above alpha,alpha,alpha', alpha'-tetrakis(ethylthio)-p-xylene, 2100 parts of glacial acetic acid, and 600 parts of 30% aqueous hydrogen peroxide was stirred under an atmosphere of nitrogen at 10–15° C. over a period of six hours and finally at room temperature for 16 hours. The reaction mixture was diluted with ice water and the resulting solid removed by filtration. There was thus obtained 111 parts (81% of theory) of alpha,alpha,alpha',alpha'-tetrakis(ethylsulfonyl)-p-xylene as white crystals melting at 255–265° C. Recrystallizatoin from a mixture of pyridine and diethyl ether afforded white crystals melting at 255–259° C.

*Analysis.*—Calcd. for $C_{16}H_{26}S_4O_8$: C, 40.5%; H, 5.5%. Found: C, 40.9%; H, 5.6%.

*Part C.—Preparation of Alpha,Alpha'-Dipotassium-Alpha,Alpha,Alpha',Alpha'-Tetrakis (Ethylsulfonyl)-p-Xylene*

To a solution of potassium t-butoxide prepared by dissolving 7.43 parts of potassium metal in 1180 parts of t-butanol was added 38 parts of the above alpha,alpha,-alpha',alpha'-tetrakis(ethylsulfonyl)-p-xylene. The mixture was stirred at reflux under an atmosphere of nitrogen overnight and then at room temperature for two days. The resulting solid was removed by filtration and the filter cake washed with t-butanol and diethyl ether. On drying, there was thus obtained 40.7 parts (92% of theory) of alpha,alpha'-dipotassium - alpha,alpha,alpha',alpha'-tetrakis(ethylsulfonyl)-p-xylene as a pale yellow solid.

*Analysis.*—Calcd. for $C_{16}H_{24}S_4O_8K_2$: N.E., 277. Found: N.E., 278.

*Part D.—Preparation of 7,7,8,8-Tetrakis(Ethylsulfonyl)-p-Quinodimethane*

To a stirred suspension of 136.2 parts of the above alpha,alpha'-dipotassium - alpha,alpha,alpha',alpha'-tetrakis(ethylsulfonyl)-p-xylene in 1950 parts of acetonitrile under an atmosphere of nitrogen was added dropwise over a period of one hour a solution of 39.7 parts of bromine in 195 parts of acetonitrile. An intense green color formed during the addition, which turned to yellow as the bromine addition was completed. The mixture was cooled in an ice/water bath and the resultant solid removed by filtration. The filter cake was suspended in water to remove potassium bromide, refiltered, and washed well with water. There was thus obtained 7,7,8,8-tetrakis(ethylsulfonyl)-p-quinodimethane as a moist yellow solid melting at 195–197° C. with decomposition. A 74% portion of the crude, moist, solid product was further purified by suspension in acetonitrile and subsequent isolation by filtration. There was thus obtained 65.4 parts (corresponding to an over-all yield of 75% of theory) of 7,7,8,8-tetrakis(ethylsulfonyl)-p-quinodimethane as a yellow solid. Low-temperature crystallization from methylene chloride under an atmosphere of nitrogen afforded the pure 7,7,8,8-tetrakis(ethylsulfonyl)-p-quinodimethane as yellow microcrystals melting at 195.5–198° C. with decomposition. A methylene chloride solution of the product showed a maximum absorption at 372 millimicrons with an extinction coefficient of 45,400.

*Analysis.*—Calcd. for $C_{16}H_{24}S_4O_8$: C, 40.7%; H, 5.1%; S, 27.1%. Found: C, 40.2%; H, 5.2%; S, 27.2%.

The present invention is generic to the 7,7,8,8-tetrakis-(hydrocarbylsulfonyl)-p-quinodimethanes and the 2,3,5,6-at most di-lower alkyl and di-lower halosubstituted 7,7,8,8-tetrakis(hydrocarbylsulfonyl) - p-quinodimethanes. The invention is likewise generic to the preparation of these tetrakis(hydrocarbylsulfonyl)-p-quinodimethanes by condensation of the requisite terephthalaldehyde carrying, where necessary, in the 2-, 3-, 5-, and 6-positions the requisite at most two lower alkyl and lower halo substituents with four molar proportions of the requisite mercaptan in the presence of a protonic acid to form the desired intermediate, alpha,alpha,alpha',alpha' - tetrakis(hydrocarbylthio)-p-xylene, followed by oxidation with a suitable strong oxidizing agent, such as hydrogen peroxide, to the desired alpha,alpha,alpha'-alpha'-tetrakis(hydrocarbylsulfonyl)-p-xylene, followed by conversion to the desired 7,7,8,8 - tetrakis(hydrocarbylsulfonyl)-p-quinodimethane by suitable oxidation means, such as, for instance, by conversion of the alpha-alpha,alpha'-alpha'-tetrakis(hydrocarbylsulfonyl)-p-xylene to an intermediate dialkali metal salt and subsequent reaction of the said dialkali metal salt with positive halogen affording the desired 7,7,8,8-tetrakis(hydrocarbylsulfonyl)-p-quinodimethane, all in accord with the following series of reactions wherein the R's are, as previously, monovalent hydrocarbyl radicals of from one to eight carbons and the X's are hydrogen, halogen of atomic number no greater than 17, i.e., fluorine and chlorine, and monovalent lower saturated alkyl radicals of from one to four carbons with, as before, the possibility that two R's on any one of the external carbons attached to the six-membered internal ring can be joined, forming with the intervening sulfur atoms and carbon intermediate therebetween ring structures of no more than six carbons each and at most two X's can be other than hydrogen:

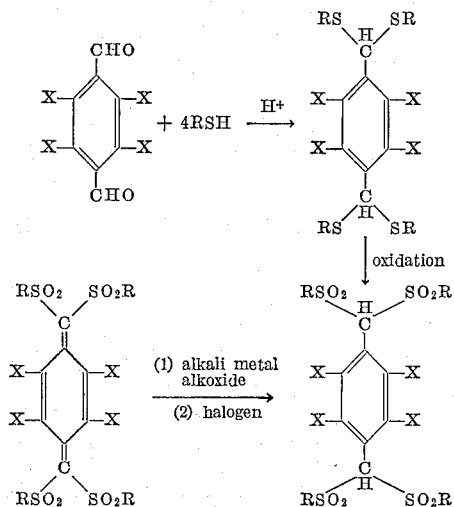

In accord with the foregoing generic product and process disclosures, the following additional information is presented to more fully illustrate the scope of the present invention. Thus, in accord with the foregoing stoichiometry from one molar proportion of 2-methylterephthalaldehyde and four molar proportions of n-octyl mercaptan in the presence of 0.1–10 molar proportions of anhydrous hydrogen chloride gas, there is obtained 2-methyl-alpha,alpha,alpha',alpha'-tetrakis(n-octylthio)-p-xylene, which by oxidation with 30% aqueous hydrogen peroxide is converted to the corresponding 2-methyl-alpha,alpha,alpha',alpha'-tetrakis(n-octylsulfonyl)-p-xylene which by reaction with potassium ethylate and iodine is converted to the desired 2-methyl-7,7,8,8-tetrakis(n-octylsulfonyl)-p-quinodimethane.

Likewise, by replacing the 2-methylterephthalaldehyde in the above procedure with terephthalaldehyde, 2-chloroterephthalaldehyde, 2,5 - difluoroterephthalaldehyde, 2-ethylterephthalaldehyde, and 2,5-dibutylterephthalaldehyde, there will be obtained, respectively, 7,7,8,8-tetrakis(n-octylsulfonyl)-p-quinodimethane, 2 - chloro-, 2,5 - difluoro-, 2-ethyl-, and 2,5-dibutyl-7,7,8,8-tetrakis(n-octylsulfonyl)-p-quinodimethane.

In similar fashion, the passage of anhydrous hydrogen chloride through a mixture of one molar proportion of terephthalaldehyde and 4.1 molar proportions of benzyl mercaptan until the mixture solidified afforded alpha,alpha,alpha',alpha'-tetrakis(benzylthio)-p-xylene as white crystals melting at 96–97° C.

Analysis.—Calcd. for $C_{36}H_{34}S_4$: C, 72.7%; H, 5.8%; S, 21.6%. Found: C, 72.5%; H, 5.7%; S, 21.6%.

Oxidation of this tetrasulfide with aqueous hydrogen peroxide in acetic acid at 50° C. affords the alpha,alpha,alpha',alpha'-tetrakis(benzylsulfonyl)-p-xylene which, on treatment with potassium tertiary butylate and bromine, is converted to 7,7,8,8-tetrakis(benzylsulfonyl)-p-quinodimethane.

Likewise, by replacing the terephthalaldehyde in the above procedure with 2-methyl-, 2-chloro-, 2-ethyl-, 2,5-difluoro-, and 2,5-dibutylterephthalaldehyde, there will be obtained, respectively, 2-methyl-, 2-chloro-, 2-ethyl-, 2,5-difluoro-, and 2,5-dibutyl-7,7,8,8-tetrakis(benzylsulfonyl)-p-quinodimethane.

Similarly, the reaction of 1,2-ethanedithiol with 2-chloroterephthalaldehyde in the presence of anhydrous hydrogen bromide results in the formation of 2-chloroalpha,alpha,alpha',alpha' - bis(1,2-ethylenedithio)-p-xylene, more properly identifiable as 2,2'-o-chloro-p-phenylenebis(1,3-dithiolane). Oxidation of this tetrasulfide with a dilute solution of potassium permanganate in acetone produces the corresponding 2-chloro-alpha,alpha,alpha',alpha'-bis-(1,2-ethylenedisulfonyl)-p-xylene, which is more properly identifiable as 2,2'-o-chloro-p-phenylenebis(1,1,3,3-tetraoxo-1,3-dithiolane), which, on treatment with potassium isopropylate followed by treatment with iodine, is converted to 2-chloro-7,7,8,8-bis(1,2-ethylenedisulfonyl)-p-quinodimethane, which is more properly identifiable as 2,2' - (2-chloro-2,5-cyclohexadiene-1,4-diylidene)bis(1,1,3,3-tetraoxo-1,3-dithiolane).

In similar fashion and in accord with the foregoing stoichiometry and means, from one molar proportion of 2,5-difluoroterephthalaldehyde and four molar proportions of methyl mercaptan in the presence of p-toluenesulfonic acid there is obtained 2,5-difluoro-alpha,alpha,alpha',alpha'-tetrakis(methylthio)-p-xylene, which by oxidation with 30% aqueous hydrogen peroxide in acetic acid is converted to the corresponding 2,5-difluoro-alpha,alpha,alpha',-alpha'-tetrakis(methylsulfonyl)-p-xylene which by reaction with potassium propylate and bromine is converted to the desired 2,5-difluoro-7,7,8,8-tetrakis(methylsulfonyl)-p-quinodimethane.

In similar fashion from one molar proportion of 2-ethylterephthalaldehyde and four molar proportions of n-propyl mercaptan in the presence of excess anhydrous hydrogen chloride, there is obtained 2-ethyl-alpha,alpha,-alpha',alpha'-tetrakis(n-propylthio)-p-xylene, which by oxidation with a dilute acetone solution of potassium permanganate is converted to the corresponding 2-ethyl-alpha,alpha,alpha',alpha' - tetrakis(n - propylsulfonyl) - p-xylene which by reaction with potassium propylate and bromine is converted to the desired 2-ethyl-7,7,8,8-tetrakis-(n-propylsulfonyl)-p-quinodimethane.

Likewise, by replacing the 2-ethylenephthalaldehyde in the above procedure with terephthalaldehyde, 2-chloro-, 2,5-difluoro-, 2-methyl-, and 2,5-dibutylterephthalaldehyde, there will be obtained, respectively, 7,7,8,8-tetrakis-(n-propylsulfonyl)-p-quinodimethane, 2-chloro-, 2,5-difluoro-, 2-methyl-, and 2,5-dibutyl-7,7,8,8-tetrakis(n-propylsulfonyl)-p-quinodimethane.

In like fashion, reaction between one molar proportion of 2-methylterephthalaldehyde and four molar proportions of n-amyl mercaptan in the presence of excess hydrogen chloride affords 2-methyl-alpha,alpha,alpha',-alpha'-tetrakis(n-amylthio)-p-xylene which upon oxidation with 30% aqueous hydrogen peroxide is converted to the corresponding 2-methyl-alpha,alpha,alpha',alpha'-tetrakis(n-amylsulfonyl)-p-xylene which by reaction with potassium tertiary butylate and iodine is converted to the desired 2-methyl-7,7,8,8-tetrakis(n-amylsulfonyl)-p-quinodimethane.

By heating a mixture of terephthalaldehyde and 4.5 molar equivalents of thiophenol at 100° C. in the presence of gaseous hydrogen chloride there is obtained alpha,-alpha,alpha',alpha'-tetrakis(phenylthio)-p-xylene, which on heating to 90° C. in a solution of hydrogen peroxide in a 2:1 by volume mixture of acetic anhydride and acetic acid is converted to alpha,alpha,alpha',alpha'-tetrakis-(phenylsulfonyl)-p-xylene. Treatment of the above with potassium tert.-butoxide and bromine produces 7,7,8,8-tetrakisphenylsulfonyl)-p-quinodimethane.

Likewise, by replacing the terephthalaldehyde in the above procedure with 2-methyl-, 2-chloro-, 2-ethyl-, 2,5-difluoro-, and 2,5-dibutylterephthalaldehyde, there will be obtained, respectively, 2-methyl-, 2-chloro-, 2-ethyl-, 2,5-difluoro-, and 2,5-dibutyl-7,7,8,8-tetrakis(phenylsulfonyl)-p-quinodimethane.

By passing gaseous hydrogen chloride through a mixture of 2,5-dibutylterephthalaldehyde and 4.5 molar equivalents of n-butyl mercaptan there is obtained 2,5-dibutyl-alpha,alpha,alpha',alpha' - tetrakis(butylthio) - p - xylene which can be oxidized to the corresponding tetrasulfone with potassium permanganate in acetic acid. Treatment of the resulting 2,5-dibutyl-alpha,alpha,alpha',alpha'-tetrakis(n-butylsulfonyl)-p-xylene with sodium methylate and bromine gives 2,5-dibutyl-7,7,8,8-tetrakis(butylsulfonyl)-p-quinodimethane.

By passing dry hydrogen chloride gas through a mixture of 2-methylterephthalaldehyde and 4.5 molar equivalents of cyclohexyl mercaptan there is obtained 2-methyl-alpha,alpha,alpha',alpha' - tetrakis(cyclohexylthio) - p-xylene which on treatment with hydrogen peroxide in a 2:1 mixture of acetic anhydride and acetic acid at 80° C. gives 2-methyl-alpha,alpha,alpha',alpha'-tetrakis(cyclohexylsulfonyl)-p-xylene which on treatment with sodium isopropylate and bromine gives 2-methyl-7,7,8,8-tetrakis-(cyclohexylsulfonyl)-p-quinodimethane.

Likewise, by replacing the 2-methylterephthalaldehyde in the above procedure with terephthalaldehyde, 2-ethyl-, 2-chloro-, 2,5-difluoro-, and 2,5-dibutylterephthalaldehyde, there will be obtained, respectively, 7,7,8,8-tetrakis(cyclohexylsulfonyl)-p-quinodimethane, 2-ethyl-, 2-chloro-, 2,5-difluoro-, and 2,5-dibutyl-7,7,8,8-tetrakis(cyclohexylsulfonyl-p-quinodimethane.

By passing dry gaseous hydrogen chloride into an agitated mixture of terephthalaldehyde and four molar equivalents of 4-ethylthiophenol, there is obtained $\alpha,\alpha,\alpha',\alpha'$-tetrakis(4-ethylphenylthio)-p-xylene, which on treatment with excess aqueous hydrogen peroxide dissolved in 2:1 acetic anhydride/acetic acid at 85° C. affords $\alpha,\alpha,\alpha',\alpha'$-tetrakis(4-ethylphenylsulfonyl)-p-xylene, which on treatment with methanolic sodium methoxide followed by bromine in acetonitrile affords 7,7,8,8-tetrakis(4-ethylphenylsulfonyl)-p-quinodimethane.

Likewise, by replacing the terephthalaldehyde in the above procedure with 2-methyl-, 2-ethyl-, 2-chloro-, 2,5-difluoro-, and 2,5-dibutylterephthalaldehyde, there will be obtained, respectively, 2-methyl-, 2-ethyl-, 2-chloro-, 2,5-difluoro-, and 2,5-dibutyl-7,7,8,8-tetrakis(4-ethylphenylsulfonyl)-p-quinodimethane.

As can be seen from the foregoing, the preparation of the 7,7,8,8-tetrakis(hydrocarbylsulfonyl)-p-quinodimethanes, conveniently referred to as (THSQ) compounds, of this invention is a three-step process involving the condensation of at least four molar proportions of the requisite mercaptan with one molar proportion of the requisite terephthalaldehyde, followed by oxidation of the resultant tetrasulfide to the tetrasulfone, and subsequent still further oxidation of the p-xylene tetrasulfone to the tetrakis(hydrocarbylsulfonyl)-p-quinodimethane. The condensation step between the terephthalaldehyde and the requisite mercaptan is normally carried out in the presence of any strong acid catalyst, such as, p-toluenesulfonic, hydrobromic, and sulfuric acids to name but a few at temperatures in the range 25–150° C.

The oxidation of the resultant p-xylene tetrasulfide will normally be carried out in other than the strongly acid systems. Normally hydrogen peroxide in acetic acid, i.e., peracetic acid, is the oxidizing condition of choice. However, perbenzoic acid, permanganate solutions, and other not strongly acid-oxidizing systems can be used. The oxidation, or more properly the quinoidation, of the p-xylene tetrasulfone is effected normally on the p-xylene tetrasulfone dianion, i.e., where each of the methyl groups external to the xylene ring and carrying the hydrocarbyl sulfonyl groups is converted to the charged anion form by reaction, for instance, with an alkali metal in the requisite two molar proportion stoichiometry or by reaction with an alkali alkoxide in the corresponding alcohol at the reflux. The inexpensiveness of the alkali metals of atomic number 19 and below make them preferred. Oxidation of the so-formed anion will normally be carried out with such sources of positive halogen as chlorine, bromine, iodine, the N-halosuccinimides, as well as such organic oxidizing agents as tetracyanoquinodimethane and tetracyanoethylene. By a source of positive halogen is meant those compounds which undergo a heterolytic cleavage to form a stable anion and a positive halogen, e.g., $Br_2 \rightarrow Br^{\oplus} + Br^{\ominus}$. Inert diluents can be present in some or all the foregoing process steps and are most helpful in the quinoidation step. Useful examples include $CH_3CN$, $CH_2Cl_2$, $CHCl_3$, and the like.

In connection with the foregoing specific disclosures and general process discussions, it should be pointed out that, while the invention is primarily generic to the (THSQ) compounds, it is likewise generic to the intermediate alpha,alpha,alpha',alpha' - tetrakis(hydrocarbylthio)-p-xylenes, the alpha,alpha,alpha',alpha'-tetrakis(hydrocarbylsulfonyl)-p-xylenes and the alpha,alpha'-dialkali metal salts of the alpha,alpha,alpha',alpha'-tetrakis(hydrocarbylsulfonyl)-p-xylene dianions, all of which compounds are new per se and are separately useful other than in forming the new (THSQ) compounds of the present invention.

The compounds of this invention can be described by the formula

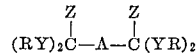

wherein R is as previously defined; A is 1,4-phenylene or the quino structure, cyclohexa-2,5-dien-1,4-diylidene; Y is —S— or —$SO_2$—, being only $SO_2$ when A is the quino structure; and Z is H or an alkali metal, the latter only when Y is —$SO_2$— and A is 1,4-phenylene, or a free valence forming a double bond with the adjacent carbon when A is the quino structure and Y is —$SO_2$—. The use of the terms 1,4-phenylene and cyclohexa-2,5-dien-1,4-diylidene is not intended to exclude substituents on the 2-, 3-, 5- and 6-positions.

The new (THSQ) compounds of this invention are crystalline organic materials, generally colored, which are soluble in such classes of organic solvents as the liquid aliphatic nitriles, e.g., acetonitrile; liquid halogenated hydrocarbons, e.g., methylene dichloride; liquid hydrocarbon ethers, e.g., tetrahydrofuran and the like. Generically these new (THSQ) products are useful as metal etchants and find use in solution form in the aforesaid described classes of solvents in etching metals, such as is conventionally practiced in the printing and engraving arts, the making of printed circuits, and the like. Such solutions also find use corresponding to conventional etchant action in electroplating and the like. More specifically, a solution of 0.5 part of 7,7,8,8-tetrakis(ethylsulfonyl)-p-quinodimethane in 27 parts of acetonitrile prepared under nitrogen was heated to the reflux with a polished sheet of copper metal partly immersed therein. The solution became deep green in color and after several minutes had changed to a yellow-orange. The copper strip on removal from the bath was found to be deeply etched in that portion which had been immersed in the solution.

The intermediate alpha,alpha,alpha',alpha'-tetrakis(hydrocarbylthio)-p-xylenes are generically crystalline organic materials, generally light or white in color. They are generically quite soluble in a wide variety of organic solvents and generically exhibit an unpleasant odor. They accordingly find use in scenting organic solvents. Low concentrations of these materials in the range of a few percent successfully label organic solvents so that, in the case of the more toxic organic solvents, their presence would immediately be known by the odor. This technique is quite conventional in the practice of industrial safety. The alpha,alpha'-dialkali metal salts of the alpha,alpha,alpha',alpha'-tetrakis(hydrocarbylsulfonyl)-p-xylenes are generically colorless solids, soluble in a wide variety of aqueous solutions. They generically are useful in neutralizing acids in such solutions and function as indicators of the presence of acids since, in the process of neutralizing the acid, the water-insoluble alpha,alpha,alpha',alpha' - tetrakis(hydrocarbylsulfonyl)-p-xylenes are formed.

The present invention is also generic to the charge-transfer compounds of the instant (THSQ) compounds. Charge-transfer compounds of previously known Lewis acids with Lewis bases are well known in the art. Frequently in the older art, these charge-transfer compounds were referred to as pi complexes. More recently, the concept has become well established that such complexes are more properly described as charge-transfer compounds—see, for instance, Mulliken, J. Am. Chem. Soc. 74, 811 (1952). The invention in its charge-transfer compound aspect is generic to a wide variety of charge-transfer compounds of THSQ with Lewis bases and ranges in respect to degree of charge transfer in these compounds from those of true complex structure to those where actual and complete charge transfer exists in the ground electronic state of the compound. Compounds of the last-mentioned type constitute so-called anion radical salts wherein at least one molecule of THSQ carries a transferred and accepted electron, and accordingly a negative electronic charge, and at least one molecule of the Lewis base component will have donated at least one electron to the THSQ component and will accordingly have an electron deficiency, and, therefore, a positive electronic charge. The invention is generic to those charge-transfer compounds of THSQ with Lewis bases which exhibit a detectable paramagnetic resonance absorption under normal conditions. It is likewise generic to THSQ charge-transfer compounds wherein the maximum charge transfer occurs not in the ground electronic state but rather in the excited state (see Orgel, Quart. Rev. Chem. 8, 422 (1954), for a discussion of this type of normally diamagnetic charge-transfer compounds).

Lewis bases which, with THSQ, form the necessary second component for forming the charge-transfer compounds of THSQ are well known to the chemical art (see G. N. Lewis, J. Franklin Institute 226, 293 (1938), and following papers by Lewis and several coauthors). Broadly speaking, the Lewis base is, by definition, simply a molecule, the structure or configuration of which, electronically speaking, is so arranged that the molecule is capable of donating one or more electrons to a molecule which has an electron-deficient structure. Many and varied electron donor compounds are known. To list but a few well-recognized such classes there need only be named: the amines and various alkyl and aryl hydrocarbon-substituted amines which may be described structurally by the following two formulas:

where $R_1$, $R_2$, $R_3$ are H, alkyl or alkylene up to 10 carbons and when $R_1$ is aryl, $R_2$ and $R_3$ are H or alkyl up to 10 carbons,

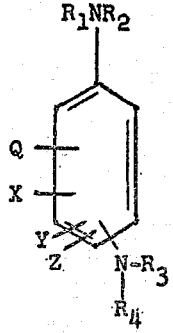

where the amino substituents are ortho or para to each other and $R_1$, $R_2$, $R_3$, $R_4$ are alkyl up to 10 carbons and Q, X, Y, Z are H or hydrocarbon up to 10 carbons, which can be together joined, or other ortho- or para-directing substituents with the provisos that (1) when $R_1$, $R_2$, $R_3$, and $R_4$ are alkyl, Q and X are H, (2) when $R_1$ and $R_3$ are aryl, $R_2$ and $R_4$ are H or alkyl, and (3) where Q—X and/or Y—Z taken pairwise are cycloalkylene or fused aromatic, $R_1$ and $R_3$ are H, and the corresponding quaternary ammonium salts wherein the quaternary radical is another $R_1$, $R_2$, $R_3$, $R_4$ and any of the usual anions is involved;

Also included are the substituted amines of the alkyl and aryl hydrocarbon-substituted types defined by the foregoing two structural formulas wherein $R_1$, $R_2$, $R_3$, and/or $R_4$ are variously oxaalkylene or thiaalkylene or oxaalkyl or thiaalkyl, e.g., 4-thiapiperidine, as well as the hydroiodides of the foregoing primary, secondary, or tertiary amines, and also the corresponding quaternary ammonium iodides, e.g., morpholine hydroiodide;

Ali heterocycles containing nuclear nitrogen and the hydroiodides or alkyl iodide salts thereof;

Substituted ethylenes of the type

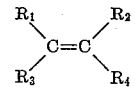

wherein from one to four of the $R_1$, $R_2$, $R_3$, or $R_4$ groups are amino or alkylamino, any remaining being alkyl, alkoxy, alkylthio, aryl, aryloxy, or arylthio; and the hydroiodide or alkyl iodide salts thereof, including the plain iodides, e.g., of the ammonium type $R_3N^+ \cdot I^-$;

And the Wurster iodides of aromatic amines, e. g., Wurster's blue iodide,

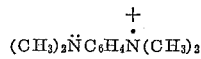

(In the foregoing diamines, it is expressly intended to include polynuclear diamines in which the nitrogens are connected by a conjugated system.)

The phosphines and alkyl or aryl hydrocarbon-substituted phosphines:

where $R_1$, $R_2$, and $R_3$ are alkyl or aryl up to 10 carbons (the aryls being unsubstituted or having o- and p-directing substituents),

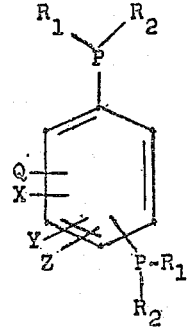

where $R_1$, $R_2$, Q, X, Y, and Z are as above in the aryl amine anologs except that $R_1$ and $R_2$ cannot be H, and the corresponding quaternary phosphonium salts wherein the quaternary radical is another $R_1$, $R_2$, $R_3$ and any of the usual anions is involved;

The arsines and alkyl and aryl hydrocarbon-substituted arsines:

where $R_1$, $R_2$, and $R_3$ are as above in the phosphine analogs,

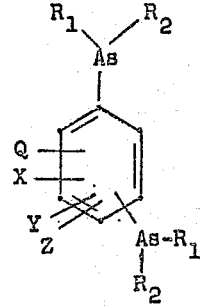

where $R_1$, $R_2$, Q, X, Y, and Z are as above in the aryl phosphine analogs, and the corresponding quaternary arsonium salts wherein the quaternary radical is another $R_1$, $R_2$, $R_3$ and any of the usual anions is involved;

The stibines and alkyl and aryl hydrocarbon-substituted stibines:

where $R_1$, $R_2$, and $R_3$ are as above in the arsine analogs,

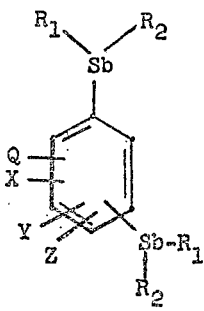

where $R_1$, $R_2$, Q, X, Y, and Z are as above in the aryl arsine analogs, and the corresponding quaternary stibonium salts wherein the quaternary radical is another $R_1$, $R_2$, $R_3$ and any of the usual anions is involved;

The quaternary ammonium bases or their salts, such as $R_1R_2R_3R_4N^{\oplus}$ where $R_1$, $R_2$, $R_3$, and $R_4$ are H or alkyl up to 10 carbons; metal cations describable by $M^{+x}$ where M is a metal and $x$ is the formal cationic valence of the metal; metal chelates having all planar configurations, the atoms which coordinate with the metal being joined by a conjugated system of double bonds (aromatic or open chain); aromatic or heterocyclic aromatic aminophenols or ethers, the O and N atoms being connected by a conjugated system of double bonds; aromatic hydrocarbon or alkyl-substituted aromatic hydrocarbons including polynuclear ones; and polyhydric phenols and ethers thereof.

In all the foregoing instances, the molecular structure in the hydrocarbon moieties can also carry other functional substituents. The preferred substituents can be classed as those which, when present on ring carbon of an aromatic nucleus, tend to direct any entering substituent radical into the ortho- or para-position, i.e., the so-called ortho-para orienting groups. These substituents have also been described by Price, Chem. Rev. 29, 58 (1941), in terms of the electrostatic polarizing force as measured in dynes of the said substituent groups on an adjacent double bond of the benzene nucleus. Quantitatively, any substituent which has or exhibits an electrostatic polarizing force in dynes less than 0.50 can be regarded as ortho-para orienting and electropositive, and is preferred here. These preferred substituents include: alkyl hydrocarbon up to 10 carbons; substituted alkyl up to 10 carbons, e.g., aminoalkyl, hydroxyalkyl, alkoxyalkyl, vinylalkyl, haloalkyl; hydroxy; alkoxy up to 10 carbons; thiol, alkyl thiol (up to 10 carbons); amino; N-alkylamino or N,N-dialkylamino with alkyls up to 10 carbons; N-monoarylamino; and the like.

Suitable specific Lewis bases for making the Lewis acid/base charge transfer compounds in molar ratios from 2/1 to 1/2 acid/base include: ammonia and amines, such as ammonia, methylamine, dibutylamine, tridecylamine, and the like; diamines, such as 2,3-N,N,N',N'-hexamethyl-p-phenylenediamine, N,N'-dioctyl-1,5-diaminonaphthalene, 1,4-diamine-5,6,7,8-tetrahydronaphthalene, and the like; phosphines and diphosphines, such as triphenylphosphine, tributylphosphine, ethyldioctylphosphine, 1,4-bis(diethylphosphino)benzene, and the like; ammonium and quaternary ammonium bases and salts, such as ammonium iodide, ethyltrimethylammonium iodide, dioctylammonium iodide, methyltri-n-propylammonium iodide, tetramethylammonium hydroxide, and the like; metal carbonyls such as iron and cobalt carbonyls; metal chelates, such as copper salicylaldimine, cobalt pyrrolealdehydeimine, nickel 4-methoxy-salicylaldoxime, copper 5-methoxy-8-quinolinolate, and the like; heterocyclic aromatic amines, phenols, and ethers, such as 4-aminopyridine, 3-hydroxyacridine, 3-dimethylaminocarbazole, 2-methoxyphenazine, and the like; aromatic hydrocarbon ethers, such as phenetidine, N,N-diethylanisidine, and the like; aromatic hydrocarbons and alkyl substituted aromatic hydrocarbons, including polynuclear, such as chrysene, coronene, hexamethylbenzene, 2-ethylphenanthrene, and the like.

In addition to the foregoing Lewis bases illustrated by genus, subgenus, and specific type, as well as by the many detailed examples, other Lewis bases well known in the art as such can also be used with the tetrakis(hydrocarbylsulfonyl)quinodimethane and the C-alkyl substituted tetrakis(hydrocarbylsulfonyl)quinodimethanes to form the new charge-transfer compounds of the present invention, including both the simple 1/1 charge-transfer compounds as well as the complex charge-transfer compounds containing combined neutral tetrakis(hydrocarbylsulfonyl)quinodimethane and C-alkyl substituted tetrakis-(hydrocarbylsulfonylquinodimethane moieties and/or combined neutral Lewis base moieties. Included in these additional, operable, known Lewis bases, in addition to those previously listed, are: such additional amines as alkyl amines, e.g., dimethylamine, trimethylamine, diethylamine, triethylamine, n-butylamine, tri-n-butylamine, butylethylmethylamine, n-eicosylamine, di-n-eicosylamine, tri-n-eicosylamine, and their N-alkyl quaternary salts with conventional anions, e.g., the halides such as iodides, chlorides, and bromides; dimethylphosphine, trimethylphosphine, diethylphosphine, triethylphosphine, n-butylphosphine, tri-n-butylphosphine, butylethylmethylphosphine, n-eicosylphosphine, di-n-eicosylphosphine, and tri-n-eicosylphosphine and their N-alkyl quaternary salts with conventional anions, e.g., the halides such as iodides, chlorides, and bromides; dimethylarsine, trimethylarsine, diethylarsine, triethylarsine, n-butylarsine, tri-n-butylarsine, butylethylmethylarsine, n-eicosylarsine, di-n-eicosylarsine, and tri-n-eicosylarsine and their N-alkyl quaternary salts with conventional anions, e.g., the halides such as iodides, chlorides, and bromides; dimethylstibine, trimethylstibine, diethylstibine, triethylstibine, n-butylstibine, tri-n-butylstibine, butylethylmethylstibine, n-eicosylstibine, di-n-eicosylstibine, and tri-n-eicosylstibine and their N-alkyl quaternary salts with conventional anions, e.g., the halides such as iodides, chlorides, and bromides; aromatic amines, e.g., 1-naphthylamine, 2-naphthylamine, 1,2-diaminonaphthalene, 1,3-diaminonaphthalene, 1,4-diaminonaphthalene, 1,5-diaminonaphthalene, 1,6-diaminonaphthalene, 1,7-diaminonaphthalene, aniline, o-phenylenediamine, m-phenylenediamine, p-phenylenediamine, o-toluidine, m-toluidine, p-toluidine, xylylamine, o-anisidine, m-anisidine, p-anisidine, 2-aminopyridine, 3-aminopyridine, 2-methoxypyridine, 3-methoxypyridine, 4-methoxypyridine, 1-aminoquinoline, 2-aminoquinoline, 3-aminoquinoline, 4-aminoquinoline, 5-aminoquinoline, 6-aminoquinoline, 7-aminoquinoline, 8-aminoquinoline and the N-alkyl, e.g., N-monomethyl, N-monoethyl, and N,N-dimethyl, N,N-diethyl derivatives, 2-aminobiphenyl, 3-aminobiphenyl, 4-aminobiphenyl and the N-methyl and N,N-dimethyl derivatives, benzidine and the N-alkyl derivatives thereof, e.g., N-methylbenzidine, N,N-dimethylbenzidine, N,N'-dimethylbenzidine, N,N,N'-trimethylbenzidine, and N,N,N',N'-tetramethylbenzidine; o-tolidine, m-tolidine, and the N-alkyl, e.g. N-methyl, derivatives analogous to those just described for benzidine, and acridine and their N-alkyl quaternary salts with conventional anions, e.g., the halides such as iodides, chlorides, and bromides; aromatic hydroxy compounds, e.g., phenols and substituted phenols, and their hydrocarbyl, particularly alkyl, ether derivatives such as catechol, resorcinol, and hydroquinone, and their mono- and dimethyl and -ethyl ethers, and phloroglucinol; other aromatic compounds, including both wholly hydrocarbon mono- and polycyclic as well as heteroatom-substituted aromatic mono- and polycyclic structures, such as phenothiazine, fluorene, carbazole, dibenzofuran, dibenzothiophene, phenazine and their 1-, 2-, 3-, 4-, 5-, 6-, 7-, and 8-aminohydroxy and -alkoxy, e.g., methoxy, derivatives and also the dimethylamino derivatives; phenanthrene, anthracene, tetracene, pentacene, 1,2-benzanthracene, 1,2,3,4-dibenzanthracene, 1,2,5,6 - dibenzanthracene, 1,2,7,8 - dibenzanthracene, 1,2-benztetracene, 9,10-dimethyl-1,2,5,6-dibenzanthracene, perylene, pyrene, durene, and pentamethylbenzene; and such other amino-containing, functionally substituted Lewis bases as 4-aminoazobenzene, aminobenzimidazole, aminobenzotriazole, glycine, methionine, pyroline, tryptophane, tyrosine, glutathione, cytosine, adenine, guanine, triazine, tetrazine, tyramine, adrenaline, mescaline, nicotine, cuskhygrine, coniine, lobeline, atropine, scopolamine, codeine, morphine, lupinine, cinchonine, and quinine.

The following example in which the parts given are by weight is submitted to more fully illustrate but not to limit the THSQ/Lewis base charge-transfer compound aspect of the present invention:

Approximately equal parts of 7,7,8,8-tetrakis(ethylsulfonyl)-p-quinodimethan and triphenylmethylarsonium iodide were placed in a small tube containing frozen acetonitrile at —80° C. The tube was flushed with nitrogen and sealed, and the sealed tube and contents were allowed to warm to room temperature whereby a green solution formed. The solution was placed in an electron paramagnetic resonance instrument and a distinct signal was obtained, indicating the presence of unpaired electrons. Within a few minutes the signal had disappeared as had also the green color. The green color and the e-p-r signal are due to the presence of the triphenylmethylarsonium/7,7,8,8-tetrakis(ethylsulfonyl)-p-quinodimethane radical anion charge-transfer compound which was formed through a one electron reduction of the quinodimethane with iodide ion.

In an analogous fashion, by mixing equal molar proportions of 7,7,8,8-tetrakis(ethylsulfonyl)-p-quinodimethane and tetraethylammonium iodide in an inert solvent such as acetonitrile in a nitrogen atmosphere, there will be obtained the green-colored tetraethylammonium/7,7,8,8-tetrakis(ethylsulfonyl) - p - quinodimethane anion-radical charge-transfer compound.

Likewise, by replacement of the tetraethylammonium iodide in the above procedure with cesium iodide, triethylamine, tert-butylamine, pyridinium iodide, and tetraphenylphosphonium iodide, there will be obtained, respectively, the cesium-, triethylammonium-, tert-butylammonium-, pyridinium-, and tetraphenylphosphonium/7,7,8,8-tetrakis(ethylsulfonyl)-p-quinodimethane anion radical charge-transfer compounds.

The mixing of equal molar proportions of quinolinium iodide and 7,7,8,8-tetrakis(ethylsulfonyl)-p-quinodimethane in an inert solvent such as acetonitrile in a nitrogen atmosphere will at once result in the formation of the green-colored quinolinium/7,7,8,8-tetrakis(ethylsulfonyl)-p-quinodimethane anion-radical charge-transfer compound.

Likewise, by replacing the 7,7,8,8-tetrakis(ethylsulfonyl)-p-quinodimethane in the above procedure with 7,7,8,8 - tetrakis - (methylsulfonyl)-, -(phenylsulfonyl)-, -(4 - ethylphenylsulfonyl)-, -(cyclohexylsulfonyl)-, and -(n-propylsulfonyl)-p-quinodimethane; 2-methyl-7,7,8,8-tetrakis(methylsulfonyl)-, -(phenylsulfonyl)-, -(4-ethylphenylsulfonyl)-, and -(cyclohexylsulfonyl)-p-quinodimethane, there will be obtained, respectively, quinolinium/7,7,8,8-tetrakis(methylsulfonyl)-, -(phenylsulfonyl)-, -(4-ethylphenylsulfonyl)-, -(cyclohexylsulfonyl)-, -(n-propylsulfonyl) - p - quinodimethane; -2-methyl-7,7,8,8-tetrakis- (methylsulfonyl)-, and -(phenylsulfonyl)-, -(4-ethylphenylsulfonyl)- and -(cyclohexylsulfonyl)-p-quinodimethane anion-radical charge-transfer compounds.

The 7,7,8,8-tetrakis(hydrocarbylsulfonyl) - p - quinodimethane/Lewis base anion-radical charge-transfer compounds of the present invention are useful as oxygen-absorbing agents with obvious utility in gas analysis and the protection of oxygen-sensitive chemicals, fuels, and the like from undesirable oxygen reaction ahead of the desired time. These charge-transfer compounds are especially useful in such uses since in the process of absorbing oxygen they undergo a fundamental color change which, therefore, provides a built-in indicator to show whether or not the absorbing potential is still present, thereby affording an easy means of maintaining oxygen-absorbing activity through the supply of additional material when the color change appears. As illustrative of this oxygen-absorbing activity and built-in color change indicator, the following more detailed disclosure is given: A solution of 0.473 part of 7,7,8,8-tetrakis(ethylsulfonyl)-p-quinodimethane and 0.551 part of the corresponding dipotassium charge-transfer anion-radical salt in 75 parts of dry acetonitrile was prepared in a closed glass system under an atmosphere of nitrogen. The system was connected to a gas-measuring buret, and gaseous oxygen at atmospheric pressure in amount corresponding to the volume occupied by 50 parts of water was injected into the system through a fritted glass disc. The green solution of the charge-transfer anion-radical salt turned yellow as the oxygen was passed through. The excess gas was collected and was found to occupy the volume corresponding to 38 parts of water, thus indicating absorption of 24% of the oxygen charged.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Compounds selected from the group consisting of compounds of the formula

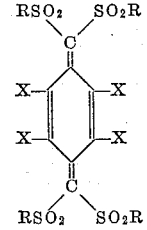

wherein R is a radical selected from the group consisting of monovalent hydrocarbon of 1–8 carbons and free from non-aromatic unsaturation and, when taken together with a second R, saturated aliphatic divalent hydrocarbon forming a ring, of not more than six annular members, with the sulfonyl groups to which said R's are attached and the single carbon intervening said sulfonyl groups; wherein 2 X's are hydrogen, the remaining X's being selected from the group consisting of hydrogen, halogen of atomic number 9–17 and alkyl of 1–4 carbons; and compounds of the formula

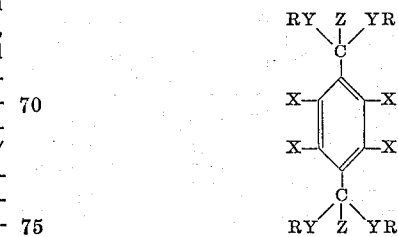

wherein R and X are as defined above, Y is selected from the group consisting of —S— and —SO₂—, and Z is H, when Y is —S—, and selected from the group consisting of hydrogen and alkali metal, when Y is —SO₂—.

2. 7,7,8,8 - tetrakis(hydrocarbylsulfonyl) - p - quinodimethan having from 0 to 2 substituents bonded to the annular carbons of said quinodimethane, said substituents selected from the group consisting of halogen of atomic number 9–17 and alkyl of 1–4 carbons, wherein said hydrocarbyl radical of said quinodimethane is monovalent hydrocarbon of 1–8 carbons and free from non-aromatic unsaturation.

3. Compounds of the formula

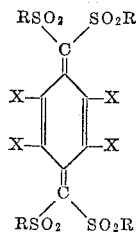

wherein R is a radical selected from the group consisting of monovalent hydrocarbon of 1–8 carbons and free from non-aromatic unsaturation and, when taken together with a second R, saturated aliphatic divalent hydrocarbon forming a ring of not more than six annular members with the sulfonyl groups to which said R's are attached and the single carbon intervening said sulfonyl groups; wherein 2 X's are hydrogen, the remaining X's being selected from the group consisting of hydrogen, halogen of atomic number 9–17 and alkyl of 1–4 carbons.

4. Compounds of claim 3 wherein said R is hydrocarbon of 1–8 carbons and free from non-aromatic unsaturation having at least 2 hydrogens bonded to the alpha carbon.

5. Compounds of claim 4 wherein said R is saturated aliphatic monovalent hydrocarbon of 1–8 carbons.

6. Compounds of claim 4 wherein R is an alkyl radical of 1–4 carbons and X is hydrogen.

7. Compounds of claim 3 wherein said R when taken together with a second R, is saturated aliphatic divalent hydrocarbon forming a ring of not more than 6 annular members with the sulfonyl groups to which said R's are attached and the single carbon intervening said sulfonyl groups.

8. Compounds of the formula

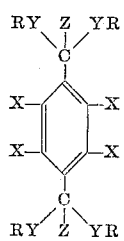

wherein R is selected from the group consisting of monovalent hydrocarbon of 1–8 carbons and free from non-aromatic unsaturation and, when taken together with a second R, saturated aliphatic divalent hydrocarbon forming a ring, of not more than six annular members, with the sulfonyl groups to which said R's are attached and the single carbon intervening said sulfonyl groups; wherein 2 X's are hydrogen and the remaining X's are selected from the group consisting of hydrogen, halogen of atomic number 9–17 and alkyl of 1–4 carbons; wherein Y is selected from the group consisting of —S— and —SO₂—, and Z is hydrogen, when Y is —S—, and is selected from the group consisting of hydrogen and alkali metal, when Y is —SO₂—.

9. Compounds of claim 8 wherein said R is saturated aliphatic monovalent hydrocarbon of 1–8 carbons.

10. Compounds of claim 8 wherein said R is alkyl of 1–4 carbons.

11. Charge-transfer compounds of compounds as described in claim 3 with Lewis bases, wherein said charge-transfer compounds are selected from the group consisting of pi complexes of said compounds of claim 3 with Lewis bases and salts of anion-radicals of said compounds of claim 3 with Lewis base cations.

12. Process for the preparation of quinodimethans of the formula

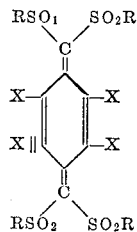

wherein R is a radical selected from the group consisting of monovalent hydrocarbon of 1–8 carbons and free from non-aromatic unsaturation and, when taken together with a second R, saturated aliphatic divalent hydrocarbon forming a ring of not more than six annular members with the sulfonyl groups to which said R's are attached and the single carbon intervening said sulfonyl groups; wherein 2 X's are hydrogen, the remaining X's being selected from the group consisting of hydrogen, halogen of atomic number 9–17 and alkyl of 1–4 carbons, which comprises condensing in the presence of a protonic acid a compound of the formula

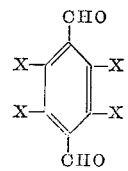

wherein X is as defined above, with a least 4 molar proportions of

RSH wherein R is a defined above; treating the resultant product with a strong oxidizing agent to form a compound of the formula

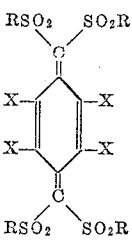

wherein R and X are as defined above, which is then oxidized to said quinodimethane.

13. Process for the preparation of compounds of the formula

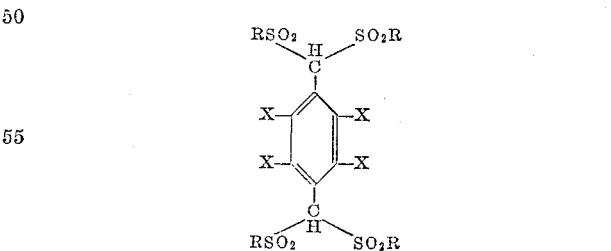

wherein R and X are as defined in claim 12, which comprises treating with a positive halogen source a compound of the formula

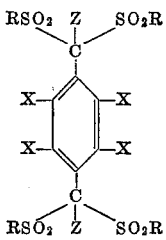

wherein R and X are as defined above and Z is an alkali metal.

14. Process for the preparation of compounds of the formula

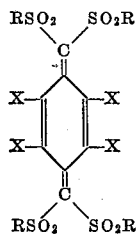

wherein R is an alkyl radical of 1–4 carbons, having at least two hydrogen atoms bonded to the alpha-carbon and is hydrogen, which comprises treating with bromine a compound of the formula

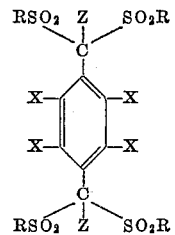

wherein R and X are as defined above and Z is an alkali metal.

No references cited.